K. P. TOGSTAD.
SPRING TIRE.
APPLICATION FILED OCT. 30, 1916.

1,226,414. Patented May 15, 1917.

Witnesses
Inventor
K. P. Togstad,
By
Attorneys

UNITED STATES PATENT OFFICE.

KAJA P. TOGSTAD, OF MADDOCK, NORTH DAKOTA.

SPRING-TIRE.

1,226,414.  Specification of Letters Patent.  Patented May 15, 1917.

Application filed October 30, 1916. Serial No. 128,539.

*To all whom it may concern:*

Be it known that I, Mrs. KAJA P. TOGSTAD, a citizen of the United States, residing at Maddock, in the county of Benson, State of North Dakota, have invented certain new and useful Improvements in Spring-Tires; and I do hereby declare the following to be a full, clear, and exact description of the invention, such as will enable others skilled in the art to which it appertains to make and use the same.

This invention relates to resilient tires for wheels and has special reference to a wheel wherein the tire is composed wholly of radially arranged coiled springs.

One important object of the invention is to improve the general construction of tires of this character.

A second important object of the invention is to provide an improved construction of tires wherein the springs which support the wheel resiliently will also act as anti-skid elements.

With the above and other objects in view, as will be hereinafter apparent, the invention consists in general of certain novel details of construction and arrangements of parts hereinafter fully described, illustrated in the accompanying drawings, and specifically claimed.

In the accompanying drawings, like characters of reference indicate like parts in the several views, and:—

Figure 1:
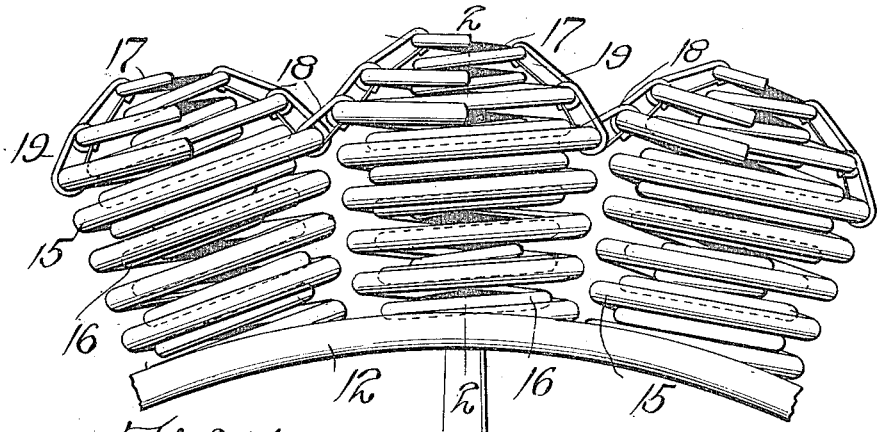
Figure 1 is a side elevation of a portion of a wheel constructed in accordance with this invention.
Figure 2:
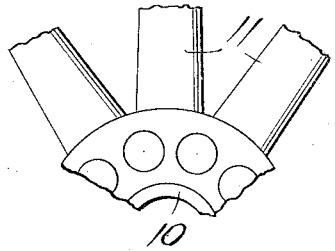
Fig. 2 is a section on the line 2—2 of Fig. 1.
Figure 3:
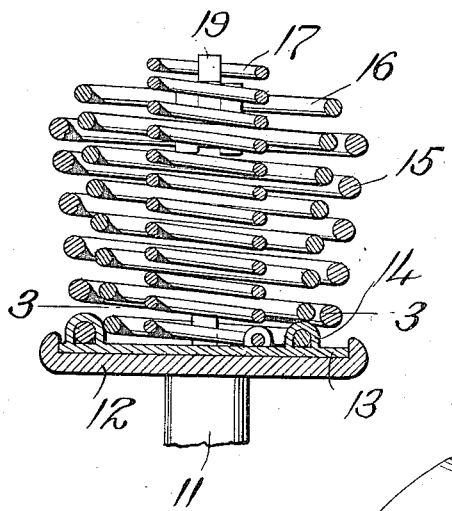
Fig. 3 is a detail section on the line 3—3 of Fig. 2.
Figure 3:
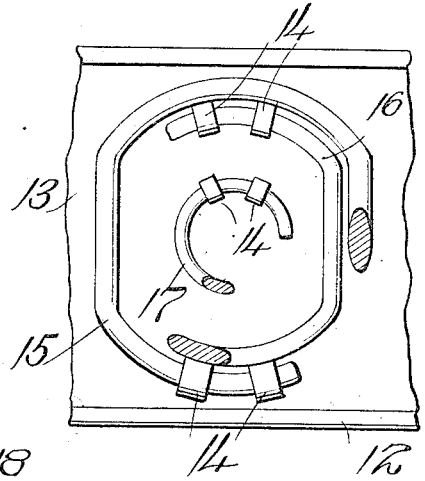
Figure 4:
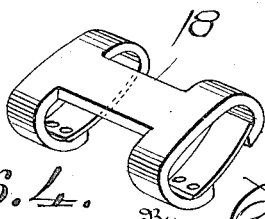
Fig. 4 is an enlarged detail showing the manner of holding two sides of the springs together.

In the embodiment of the invention herein illustrated there has been disclosed a vehicle wheel provided with the usual hub 10, spokes 11 and rim 12. Surrounding the rim 12 is a flexible steel band 13 on which is mounted a series of sets of loops 14. Secured to the outermost loops of each set is a frusto-conical coiled spring 15 having opposed and flattened sides. This spring is made of heavy spring steel and inside thereof is a second similarly shaped spring 16 which is, of course, smaller in diameter than spring 15 but is slightly longer than said spring 15 so that its end projects outward from the outer end of spring 15. Nested within the spring 16 is a third coil spring 17 which is preferably cylindrical in form and of such length that its outer end projects beyond the end of spring 16 under normal conditions. The spring 16 is made of lighter material than the spring 15 and the spring 17 is still lighter than the spring 16. By means of this arrangement the ends of the springs 17 successively contact with the ground under light loads, while as the load increases the ends of the springs 16 and 15 are brought successively into contact with the ground. Furthermore the flattened sides of the springs 15 are preferably in contact when the springs are compressed so that these springs are supported one by the other against any movement around the periphery of the wheel. Furthermore the springs 15 have their flattened sides connected together by suitable clamps or loops 18 and in like manner the springs 16 and 17 are connected together and to the springs 15 by other loops 19.

These loops or links simply consist of flat pieces of metal bent at the ends to connect to respective springs.

Thus in operation the ends of the springs contact with the ground as the wheel moves and prevents slipping or skidding of such wheel while at the same time they yield so as to eliminate shock and vibration due to running over rough roads.

There has thus been provided a simple and efficient device of the kind described and for the purpose specified.

It is obvious that many minor changes may be made in the form and construction of the invention without departing from the material principles thereof. It is not, therefore, desired to confine the invention to the exact form herein shown and described but it is wished to include all such as properly come within the scope claimed.

Having thus described the invention, what is claimed as new is:—

The combination with a wheel having a rim; of a series of sets of springs, the springs in each set being nested one within the other and being graduated in strength from the outer spring inward, said springs further gradually increasing in length from the outer spring inward, the two outer springs having flattened sides, and means to link the flattened sides of each outer spring to the adjacent sides of adjoining springs.

In testimony whereof, I affix my signature, in the presence of two witnesses.

Mrs. KAJA P. TOGSTAD.

Witnesses:
G. O. HAUGEN,
C. W. KEMMER.

Copies of this patent may be obtained for five cents each, by addressing the "Commissioner of Patents, Washington, D. C."